March 28, 1939.  E. S. HALL  2,152,351
ENGINE MECHANISM
Filed Feb. 8, 1938
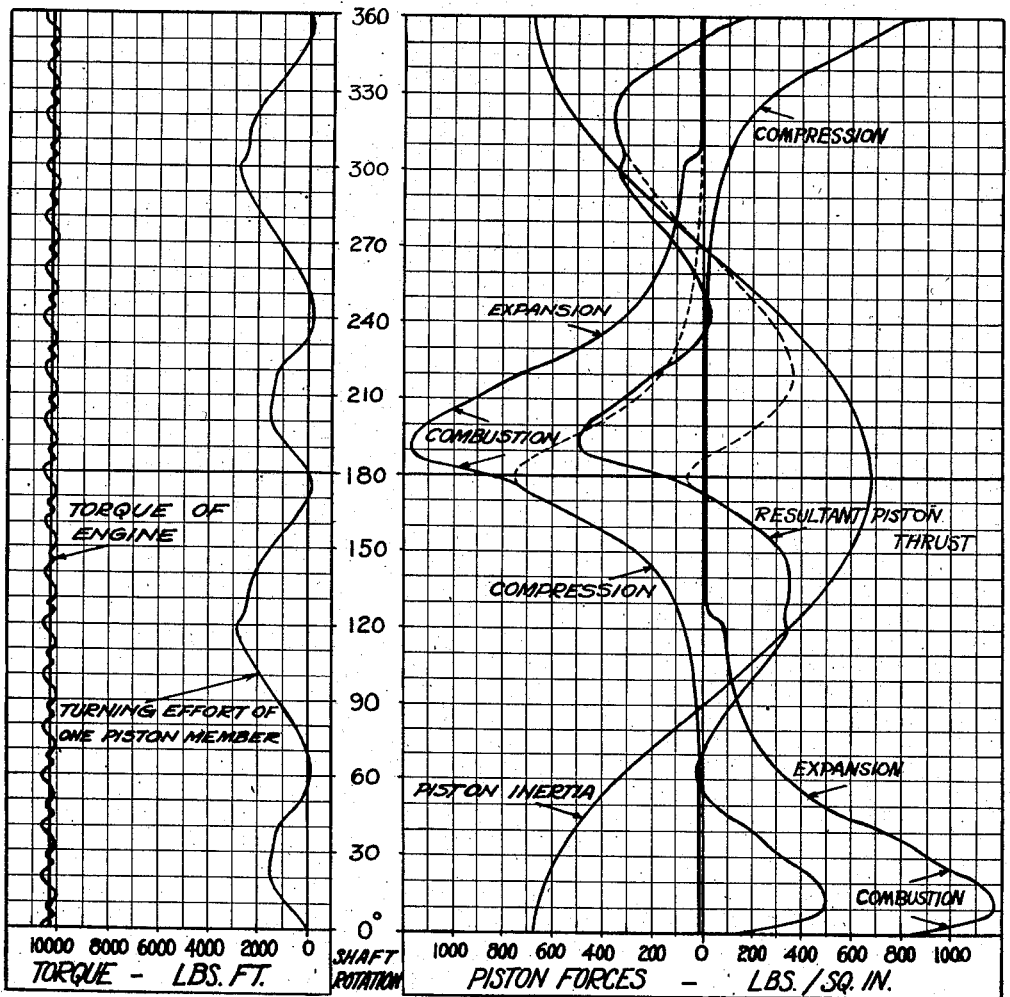
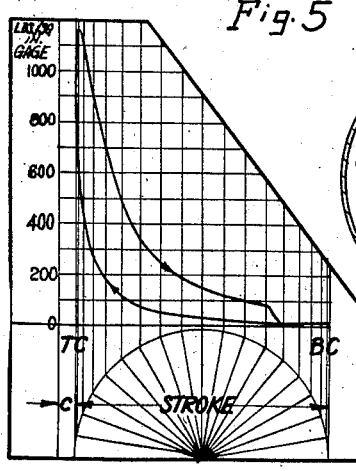
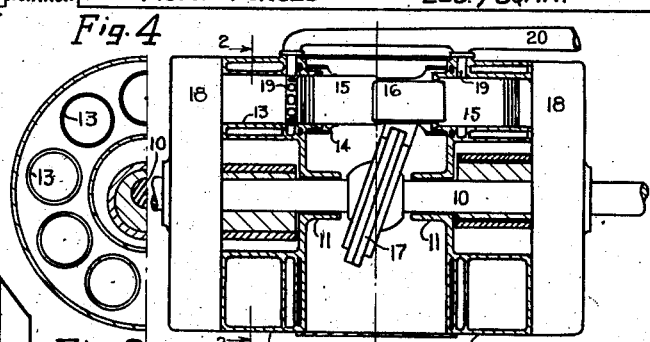
Fig. 5  Fig. 4  Fig. 2  Fig. 1
Fig. 3
INVENTOR.
Edwin S. Hall Patented Mar. 28, 1939

2,152,351

UNITED STATES PATENT OFFICE 2,152,351

ENGINE MECHANISM

Edwin S. Hall, New Haven, Conn.

Application February 8, 1938, Serial No. 189,402

5 Claims. (Cl. 123—58)

This invention relates to engine mechanisms of the type having cylinders parallel to the shaft, commonly called "barrel type" or "round engine mechanisms". This application is a continuation in part of my copending application Serial Number 67,017 filed March 4, 1936.

This invention is concerned with the "normal" type of round engine mechanism, (i. e. that type having double-ended piston members serving two similar groups of working cylinders with the reciprocating-rotary mechanism between them), and is applicable generally to all fluid pressure engines and pumps in which the operation is on the two-stroke cycle. It is especially advantageous for high pressure steam engines and for Diesel engines—fuel injection, compression-ignition engines—and it may be conveniently described as applied to a Diesel engine without limiting its scope thereto.

Objects of this invention are to provide a compact arrangement of the cylinders to obtain large piston displacement with minimum engine bulk, to provide a machine capable of smooth operation, to provide a mechanism having unusually low maximum operating stresses and bearing loads, and as a consequence of the foregoing, a mechanism of unusually low specific weight and unusually high mechanical efficiency.

A particular object of this invention is to make possible a simpler and safer type of engine for aircraft, and more specifically, a relatively small and compact Diesel aircraft engine of less weight per horsepower than that of the best gasoline aircraft engines now available.

It has been stated that the Diesel engine must necessarily be heavier than the gasoline engine because the ratio of maximum to mean cylinder pressures is higher in the Diesel. High maximum cylinder pressures ordinarily require much stronger and heavier parts in the engine mechanism with larger and heavier bearings. At the present time, the lightest Diesel aircraft engines weigh about two pounds per horsepower, while the best gasoline engines weigh only a little more than one pound per horsepower. An object of this invention is to provide a method of arranging and constructing Diesel aircraft engines so that the structure is more compact and inherently rigid and strong with a minimum amount of metal, and so that the maximum operating loads and stresses in the engine mechanism and on the bearings are not any higher than in gasoline engines, thereby making it possible to build Diesel engines weighing less than one pound per horsepower.

Diesel engines, because of the high maximum pressures ordinarily present, are usually quite rough. A further object of this invention is to provide a Diesel engine relatively smooth in operation—a Diesel engine having two power impulses for every stroke of each piston member— a Diesel engine with a torque curve showing twice as many impulses per revolution as the total number of cylinders with negligible variation from the mean torque, for example, an 18-cylinder Diesel engine with a torque curve showing 36 impulses per revolution with a variation from the mean torque of about 2%.

A further object is to arrange and construct an engine mechanism so that the peak cylinder loads at every piston stroke are offset by piston inertia so that the resultant piston thrust has no high maximums but is more uniform, and so that more of the resultant piston thrust occurs near mid-stroke where its mechanical advantage is greater than when near center, thus relieving the bearings and resulting in lower friction losses and higher mechanical efficiency.

A further object is to provide a double-acting engine mechanism with equal piston areas at both ends of the piston unit, with no piston rods or piston rod seals, the power being taken laterally to the shaft from the central portion of the piston unit, instead of axially thru one of the cylinder chambers.

Briefly described, the invention consists of the arrangement of the cylinders of an engine in the most compact manner, parallel to the shaft, for maximum strength and rigidity of the engine structure with minimum bulk and weight, in combination with the construction and arrangement of the reciprocating parts so that their inertia forces combine with the fluid pressures in the cylinders to make the maximum operating loads on the reciprocating-rotary mechanism only about half as heavy as the maximum cylinder pressures, thus permitting the parts of the mechanism to be lighter.

Further details of the invention will be understood from the following discussion in connection with the drawing in which:

Fig. 1 is a longitudinal section of a round engine mechanism, which may be that of a two-stroke Diesel engine;

Fig. 2 is a transverse section on the line 2—2 of Fig. 1;

Fig. 3 is the theoretical indicator card of a Diesel engine such as that represented in Figs. 1 and 2;

Fig. 4 is a plot of the piston forces in such an engine, on the basis of degrees of shaft rotation during one revolution; and Fig. 5 is a plot of the turning effort of one piston member, and the torque on the shaft of the 9 piston members of such an 18-cylinder engine as that represented in Figs. 1 and 2.

Referring to the drawing, in Figs. 1 and 2, shaft 10 is operably supported in bearings 11 in cylinder blocks 12. The two cylinder blocks 12 are identical, and each contains the same number of cylinders 13 spaced about and parallel to shaft 10. The two cylinder blocks 12 are suitably fastened together with crosshead guides 14 between them, forming a compact and rigid structure with the corresponding cylinders 13 of the two blocks 12 in alignment with their respective crosshead guides 14.

Double-ended piston members each comprising two pistons 15 and a central portion 16, are operable in the cylinders 13. Central portions 16 may be formed as crossheads operable in guides 14, and are operably connected to shaft 10 by any suitable mechanism such as cam and roller, swashplate, or wabbler means, indicated by wabbler 17. Any suitable cylinder head and valve mechanism 18 may be provided for each cylinder block 12, the details thereof not forming any part of this present invention. If the mechanism is to be operated as a two-stroke internal combustion engine, ports 19 in the walls of cylinders 13 may serve as intake ports controlled by pistons 15, the working medium being supplied thereto thru manifold 20 by any suitable blower means.

Minimum engine bulk and weight for a given piston displacement is dependent on the number and arrangement and construction of the cylinders to give a strong and rigid engine structure with the least metal, in combination with the arrangement and construction of the reciprocating masses relative to the cylinder processes and engine speed so as to give the lowest peak operating stresses and loads in the reciprocating-rotary mechanism to permit the parts thereof to be as light as possible.

Considering first the cylinder arrangement, the normal round engine should have at least six cylinders, three at each end. The use of more than six cylinders is desirable; three cylinders in a group cannot effectively fill the cylinder circle, and spaced power strokes during each revolution of the shaft contribute to smoothness. To get minimum engine bulk and weight for a given piston displacement, the cylinders should be spaced as closely together and should have as large a bore as practicable, greater compactness being realized with fewer cylinders of larger bore. However, enough cylinders must be used to get a suitable stroke/bore ratio with enough room within the cylinder ring for an adequate reciprocating-rotary mechanism. All things considered, for steam engines, six reciprocating members seems the best number, and for internal combustion engines, either six, seven, eight, or nine.

Fig. 1 represents an 18-cylinder two-stroke Diesel engine of 6" bore and 8" stroke to deliver 3000 BHP at 1800 rev./min. cruising speed with a rated output of 3300 BPH at 2000 rev./min. It is readily seen that the engine is unusually compact—a piston displacement of 4070 cu. in. in an engine bulk 35" diameter by 66" long. Structure inherently rigid and strong can be obtained in this engine with a minimum amount of metal.

This is a Diesel and common practice in Diesel engine construction is to make the mechanism much heavier than in gasoline engines. Provision must be made not only for carrying the full maximum cylinder pressures on the mechanism, but also for carrying the inertia loads on the mechanism. Piston inertia forces, in engines of commonly known types, produce high operating stresses and bearing loads, and tend to limit the speed of the mechanism by causing a rapid increase in the friction losses as the speed increases. In many engines, the bearing loads due to piston inertia are more severe than any due to fluid cylinder pressures. Consequently the piston is ordinarily made as light as possible consistent with sufficient strength and capacity for heat dispersal, to minimize the inertia forces.

In this invention, piston inertia forces, instead of being objectionable, are useful and serve to reduce operating stresses and bearing loads, permitting the parts of the reciprocating-rotary engine mechanism to be lighter, improving the mechanical efficiency, and permitting faster speed. The mass of the reciprocating member is determined by considerations of engine speed and the fluid cylinder pressures operating on the ends of the piston member, as will now be described with the specific example shown in the drawing.

In an engine such as that shown in Fig. 1, operating on the two-stroke cycle, the piston member oscillates between high fluid pressures which peak first at one end and then at the other. The piston inertia forces are always opposed to these peak fluid pressures. Having realised this condition, it remains to determine the optimum inertia force which the piston member should have to permit the lightest and most satisfactory mechanism.

The indicator card, depicting the cylinder process in terms of fluid pressures plotted against piston stroke, can be drawn from knowledge of similar machines, and is shown in Fig. 3. As the piston moves from bottom center (marked BC) toward top center (TC), the air in the cylinder is compressed into the volume indicated by the distance C and the pressure rises to over 600 lbs./sq. in. substantially in accordance with the law:

$$PV^{1.3} = \text{constant}.$$

Approaching top center, oil is injected. The ensuing combustion increases the pressure to a maximum or peak of almost 1200 lbs./sq. in. and as the piston returns toward bottom center, the pressure decreases until the exhaust valve opens some 60 degrees before bottom center, dropping the pressure sharply. Immediately thereafter the scavenge ports open and air at blower pressure begins to scavenge the cylinder, making ready for the next compresion stroke.

The fluid pressures are replotted on the time or shaft rotation basis in Fig. 4, and separate curves are shown for the pressures acting simultaneously on the two ends of the piston member. In Fig. 1, the fluid pressure operating on the right end of the piston member, comprising pistons 15 and crosshead portion 16, is near its maximum, the piston being on top center in the position for combustion. This pressure tends to push the piston member to the left and is therefore plotted to the left of the zero axis in Fig. 4, while the scavenge pressure acting on the left end of the piston member is plotted to the right of the zero axis. These conditions for this particular piston member at the instant shown are depicted in the middle of Fig. 4 at 180 degrees.

At this instant, the piston member has its maximum inertia force acting to the right, opposite to the high fluid pressure. The curve piston inertia forces can be plotted conveniently as a cosine curve, piston motion in engines of this sort being harmonic or nearly so. Such a piston inertia curve is shown in Fig. 4.

The resultant piston thrust at any instant is the summation of the pressures acting on the two ends of the piston member and the piston inertia force. Adding these three, the curve of resultant piston thrust can be plotted as in Fig. 4. This is the picture of the actual forces acting on the reciprocating-rotary mechanism to produce the torque of shaft 10.

If the resultant piston thrust curve is not as smooth as desired, if it has any peaks that are too high, another piston inertia curve can be tried. More piston inertia can be had either by increasing the mass of the piston or by increasing the rated engine speed, or both. Ordinarily best results are had if the maximum inertia force is taken somewhat more than one-half the magnitude of the maximum fluid pressure.

The curve of resultant piston thrust shown in Fig. 4 is very nearly the best that can be had with the fluid pressures present. It has two moderate impulses per stroke, and peak piston thrusts less than 500 lbs./sq. in. of piston area, in spite of cylinder pressures of almost 1200 lbs./sq. in. Consequently, for aircraft purposes where the engine need never deliver its full power nor develop maximum cylinder pressures unless running at rated speed, the reciprocating-rotary mechanism need be designed to carry only 500 lbs./sq. in. instead of the maximum cylinder pressure of 1200 lbs./sq. in. The mechanism can therefore be no heavier than that required for a gasoline engine. In fact, the gasoline engine mechanism would have to be heavier than the Diesel, if the gasoline engine were run on the four-stroke cycle, for in that case, the piston inertia loads on exhaust stroke have nothing to offset them so that the peak piston thrust would be heavier in such an engine than any shown in Fig. 4.

From the piston inertia curve which combines with the fluid pressure curves to produce the best resultant piston thrust, the desired reciprocating mass can be calculated from the relationship:

$$F = M \times \frac{S}{2 \times 12} \times \left(\frac{2\pi N}{60}\right)^2$$

in which:

$F$ = lbs. maximum piston inertia force = specific piston inertia force from the curve × the sq. in. of piston area $M$ = effective reciprocating mass = $\frac{\text{weight of reciprocating member}}{g}$ $S$ = number of inches in the length of piston stroke $N$ = rev./min. rated engine speed.

As applied to the case in hand, this gives the desired weight of the reciprocating member as 42 lbs., a reasonable amount for a double-ended piston member for cylinders of 6" bore, together with the associated parts.

In Fig. 4, the primary peak resultant piston thrust is just under 500 lbs./sq. in. while the secondary peak, after mid-stroke, is only about 350 lbs./sq. in. If the piston member had been made heavier, these two peaks could be made equal, in which case the maximum resultant piston thrust would be only about 425 lbs./sq. in. This was not done in the interest of engine smoothness.

In Fig. 5, the turning effort resulting from the piston thrust is plotted. The two peaks per stroke follow thru into this curve, but the primary peak is the smaller in this case than the secondary. The reason is that the secondary peak of resultant piston thrust is near mid-stroke when its mechanical advantage is greater, so that the secondary peak of thrust is more effective in producing torque than the primary. There are still two distinct torque impulses for every stroke of the piston member, and when all the turning efforts of the 9 piston members are added together, the result is the torque of the engine, as plotted in Fig. 5, the curve showing 36 impulses per revolution from an 18-cylinder engine having 9 piston members, with a variation from the mean torque of about ±2%.

When it is realised that the variation from mean torque in so smooth an engine as an 8-cylinder gasoline automobile engine may be as much as ±40%, the extraordinary improvement in performance made possible by this invention can be appreciated. Moreover, the engine mechanism does almost no negative work driving the pistons; practically the only bearing loads in the mechanism are those which result in useful torque. Consequently there are almost no useless bearing loads or friction losses in the mechanism and the mechanical efficiency is high. Nevertheless, while the flow of power is very smooth and continuous, there are two reversals of loading in the bearings of the mechanism during each stroke, permitting the bearings to have a chance to "breathe" oil and maintain their lubrication.

It is interesting to note that the resultant piston thrust does not exceed the amount of the moderate peak noted, even when cylinder pressures are less than those usual when developing rated power, as when less fuel is injected, or even in case the cylinder misses entirely. This latter limiting condition is depicted by the dotted curves in Fig. 4, which show the re-expansion curve without combustion and the resultant piston thrust when the re-expansion curve is added to the piston inertia curve. The resultant shows a negative thrust, but of smaller magnitude than the peak resultant thrust during normal operation.

Having thus described the invention, it is evident that the objects thereof as stated have been attained. A method has been provided for building Diesel engines for aircraft of less weight per horsepower than that of the best gaoline aircraft engines now available. This means that the fire hazard in aircraft can be greatly reduced. At the same time, improved reliability can be had, not only because the two-stroke Diesel engine is inherently simpler and more reliable than any four-stroke gasoline engine, but also because this particular two-stroke Diesel is naturally a rugged structure and can be even simpler than most two-stroke Diesels when full advantage is taken of the compact and convenient parallel cylinder arrangement.

While I have shown and described the invention in connection with a specific Diesel engine, it is understood that the invention is not limited to Diesels, and that changes may be made in the method of building engines and in the arrangement and construction of the various parts and in the operation thereof, without departing from the spirit or scope of the invention as expressed in the following claims.

I claim:

1. In a parallel cylinder mechanism, a shaft, cylinders spaced about and parallel to said shaft in two similar groups facing each other, double-ended piston members connecting and operable in corresponding cylinders of said two groups, and operable connections located between said groups of cylinders and connecting the central portions of said piston members with said shaft, said piston members and associated reciprocating parts of said operable connections having such mass that the inertia forces thereof at rated speed of the mechanism will combine with the fluid cylinder pressures acting on said piston members so that the resultant piston thrust will have peaks occurring twice as often and only about half as heavy as the peaks of fluid cylinder pressure.

2. In a parallel cylinder Diesel engine, a shaft, cylinders spaced about and parallel to said shaft in two similar groups facing each other, double-ended piston members connecting and operable in corresponding cylinders of said two groups, and operable connections located between said groups of cylinders and connecting the central portions of said piston members with said shaft, each of said piston members and associated reciprocating parts of said operable connections having an effective reciprocating mass defined by the following relationship:

$$M = \frac{(1200 \text{ to } 1500) P}{S \times N^2}$$

in which:
P = maximum fluid pressure operating on each end of any piston member during normal operation;
S = number of inches in the piston stroke;
N = rev./min, rated engine speed; and
M = effective reciprocating mass of each piston member and associated parts.

3. A practical light-weight Diesel engine comprising a shaft and cylinders arranged compactly parallel to said shaft in two similar groups facing each other and forming an engine structure inherently strong and rigid yet of minimum weight, in combination with double-ended reciprocating piston members operably connected to said shaft and of such mass that when operated in said cylinders at rated speed and load the peak resultant piston thrusts shall occur twice as often and shall be only about half as heavy as the peak fluid cylinder pressures acting on the ends of said piston members.

4. A parallel cylinder engine mechanism comprising a shaft, cylinders spaced about and parallel thereto in two similar groups facing each other, double-ended piston members operable in said cylinders, and means located between said groups of cylinders and operably connecting said piston members with said shaft, said mechanism being so constructed and arranged and said piston members having such mass that at normal speed during each piston stroke the resultant piston thrust shall have a primary peak early in said stroke and a secondary peak shortly after mid-stroke and more effective in producing torque than said primary peak, the torque imposed on said shaft by said piston stroke having two impulses of which that produced by said secondary peak piston thrust is the greater.

5. A parallel cylinder mechanism comprising a shaft, cylinders spaced about and parallel thereto in two similar groups facing each other, double-ended piston members operable in said cylinders, and means located between said groups of cylinders and operably connecting said piston members with said shaft, said mechanism being so constructed and arranged and the reciprocating parts thereof having such mass that at normal speed said shaft shall have two torque impulses for each stroke of each of said piston members, one of said two impulses during each half of said stroke.

EDWIN S. HALL.